United States Patent Office 3,345,421
Patented Oct. 3, 1967

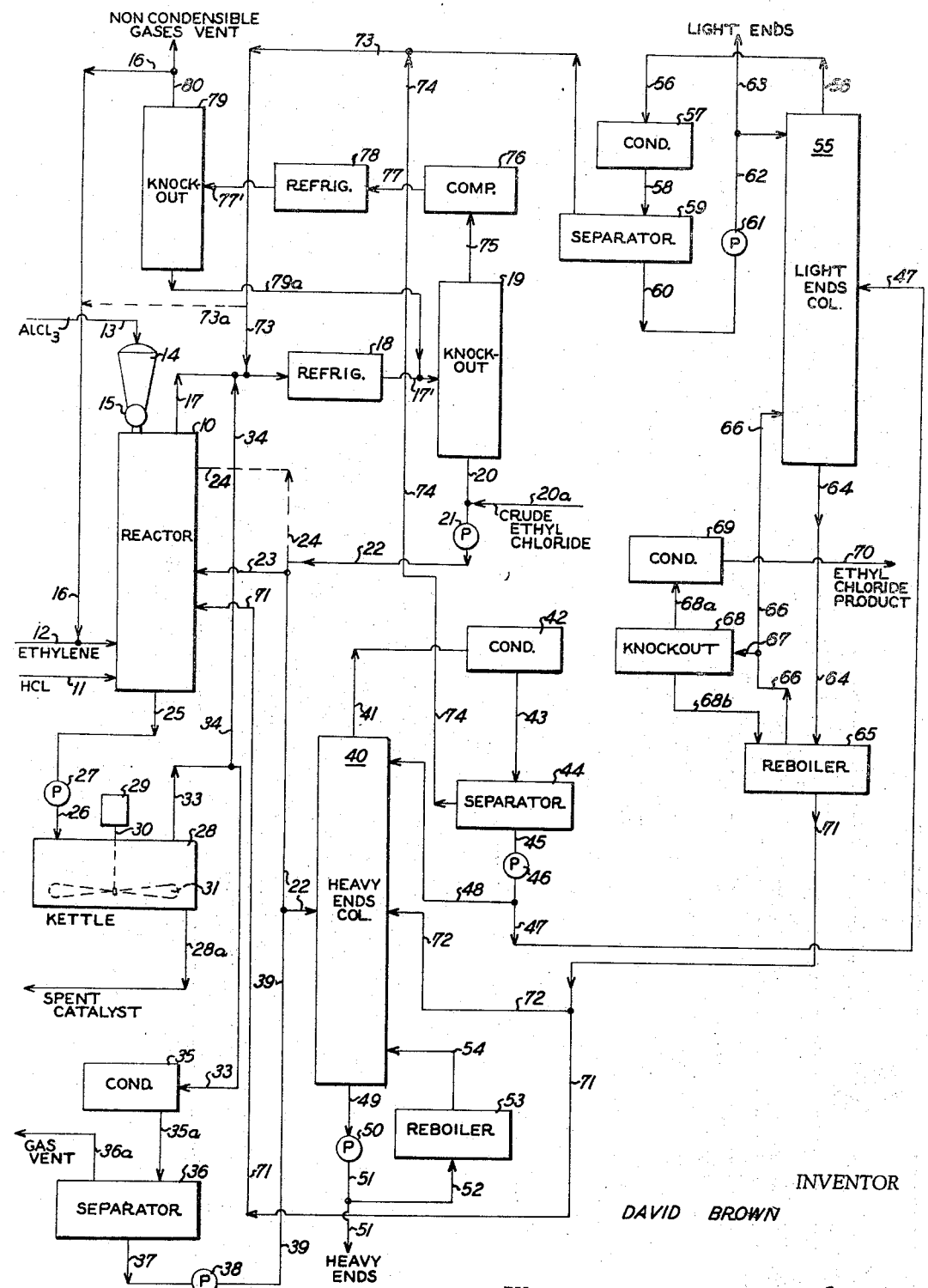

3,345,421
PREPARATION OF ETHYL CHLORIDE
David Brown, Milbrook, Greenwich, Conn., assignor to Halcon International, Inc., a corporation of Delaware
Filed Nov. 24, 1961, Ser. No. 154,797
3 Claims. (Cl. 260—663)

This invention relates to processes for the preparation of ethyl chloride by hydrochlorination of ethylene in the presence of aluminum chloride catalyst, more particularly to such a process wherein the catalyst is mixed with ethyl chloride and the reaction temperature is controlled by evaporation of ethyl chloride at moderate pressure and at least a part of the process vapor content of HCl and ethylene is recycled to the reaction mixture and especially to such a process wherein a part of the reaction mixture is withdrawn and ethyl chloride is separated therefrom and after removal of heavy ends therefrom is recycled to the reaction mixture.

The preparation of ethyl chloride by the hydrochlorination of ethylene in the presence of an aluminum chloride catalyst has achieved commercial success. However, difficulty is encountered in controlling the reaction temperature, and it is undesirable to reduce the pressure in order to keep the temperature of the reaction mixture low enough e.g., down to the neoghborhood of 10° C. Another problem is increasing the overall yield based upon HCl and ethylene. Due to the corrosion problems inside the reaction system, the use of mechanical stirring is undesirable. The art is also faced by the problems of improving the agitation inside the reactor, as well as improving temperature control, and also improving the control of the HCl to ethylene ratio without increasing vent losses.

The discoveries associated with the invention and relating to the solution of the above problems, and the objects achieved in accordance with the invention as set forth herein include the provision of:

a process for producing ethyl chloride by reaction of HCl and ethylene in the presence of a liquid mixture of ethyl chloride and an aluminum chloride catalyst wherein the reaction temperature is controlled by vaporization of ethyl chloride, and ethyl chloride vapors are processed to recover ethyl chloride, heavy ends and light ends, including the improvement which comprises recycling to the reactor unreacted HCl and ethylene separated from the ethyl chloride vapors;

such a process wherein some non-condensible gas is also recycled to the reactor;

such a process wherein the amount of HCl and ethylene in the recycle is in the range of 10 to 200% of the total HCl and ethylene is in the fresh feed;

such a process wherein the fresh feed is 100 mols of ethylene and 100 mols of HCl per hour and the recycle is about 40 mols of ethylene and about 60 mols of HCl per hour;

such a process which includes removing a small portion of the reaction mixture and vaporizing ethyl chloride therefrom followed by removing at least a part of the higher boiling materials from the vaporized material, liquifying it and recycling it to the reactor;

such a process wherein the amount of material drawn off from the reactor is in the range of 1 to 10% by weight of the fresh feed rate of ethylene plus HCl;

such a process wherein the draw-off is intermittent and the ethyl chloride is removed from the draw-off intermittently;

such a process wherein the draw-off is continuous and the ethyl chloride is removed therefrom continuously;

and other objects which will be apparent as details or embodiments of the invention set forth hereinafter.

The accompanying drawing is a schematic flow diagram of one embodiment of the invention.

In order to indicate still more fully the nature of the present invention, the following examples of typical procedures are set forth in which parts and percents mean parts and percents by weight, respectively, unless otherwise indicated, it being understood that these examples are presented as illustrative only and they are not intended to limit the scope of the invention.

Example 1

In this example, the ethyl chloride vaporized in the reactor is processed to remove heavy ends therefrom and then to separate ethyl chloride product. A light ends fraction is also separated. Vapors containing ethylene and HCl are separated at various points in this processing system, and these vapors are recycled to the reactor, whereby there is substantially complete conversion of the HCl and the ethylene feed to the desired product, ethyl chloride. A small proportion of these vapors is vented with non-condensible gases in order to prevent excessive build-up of the latter in the system.

The feed is 100 mols per hour of ethylene and 100 mols per hour of HCl, the reactor containing about 500 to 1000 mols of liquid ethyl chloride. The reaction temperature is at about 10° C. at atmospheric pressure and 40 mols of HCl are recycled per hour. The yield is 98.5 mols of ethyl chloride per hour.

Preferably, the reaction mixture is purged of spent catalyst and also of undesirable high boiling materials by bleeding or drawing off an amount of the reaction mixture equal to about 1 to about 10% by volume of the fresh feed rate. This may be done intermittently or continuously, preferably the latter with vaporization of the ethyl chloride and recycling to the reaction mixture after removing at least a part of the heavy ends therefrom. After the process has been continued for sufficient time to build up spent catalyst in the boil-off kettle, the draw-off is stopped and the kettle is drained, and then the process is continued. If desired the kettle may be heated to boil off vaporizable materials prior to draining.

This procedure is described in detail in the following description of the overall process.

Referring to the accompanying drawing, the reactor 10 is charged with liquid ethyl chloride and aluminum chloride catalyst and maintained at about atmospheric pressure and at approximately the boiling point of ethyl chloride. Ethylene is fed thereinto via line 12 and HCl is fed via line 11.

The reaction is autothermic, all heat being removed by the evaporation of ethyl chloride which passes via line 17 through refrigerated condenser 18 and then via line 17' to knock-out vessel 19 where crude liquid ethyl chloride is separated from the unreacted HCl and ethylene vapor. These unreacted materials are passed via line 75 to compressor 76 wherein they are compressed and then passed via line 77 to refrigerated condenser 78 and the resulting condensed mixture is passed via line 77' to knock-out vessel 79. The vapors separated therein are passed via lines 80 and 16 to reactor 10, a part thereof being vented via line 80 to prevent build-up of non-condensible gases in the system.

More crude ethyl chloride is vaporized in the reactor than is made therein, and accordingly liquid ethyl chloride must be supplied to the reactor to maintain the liquid level. Initially this is supplied via line 20a, pump 21 and lines 22 and 23 or 24.

The net crude liquid ethyl chloride is passed from vessel 19 via lines 20, pump 21 and line 22 to heavy ends column 40, and a part thereof may be passed via line 23 or line 24 back to the reactor 10 if desired. The vapors from column 40 are passed via line 41 to condenser 42 and the condensed mixture is passed via line 43 to separator 44. The vapors separated in the latter are passed via lines 74 and 73 to refrigerated condenser 18. The liquid is passed from separator 44 via line 45, pump 46 and line 47 to the light ends column 55. The bottoms fraction from column 40 is passed to line 49, pump 50 and line 51 from which heavy ends are removed. A part thereof is passed via line 52 to reboiler 53 wherein it is heated and then via line 54 back to column 40.

The ethyl chloride is separated as a bottoms fraction in column 55 and it is withdrawn via line 64. It may be withdrawn from the system thereby, by a side line (not shown), but preferably is passed to reboiler 65 wherein it is heated and a part thereof is then passed via line 66 back to column 55. A part of the reheated mixture is passed to knock-out vessel 68. The liquid therein is passed via line 68b back to reboiler 65. The separated vapor is passed from vessel 68 via line 68a to condenser 69 and the resulting liquid is the ethyl chloride product which is withdrawn via line 70.

As set forth more fully in a companion application filed herewith, the condenser and draw-off lines are made of non-ferrous alloy so as to provide a product which is not contaminated by iron. A portion of the material may be passed from reboiler 65 via line 71 back to the reactor. This material contains only traces of heavy ends or high-boilers.

The vapor from column 55 is passed via line 56 to condenser 57 and the resulting mixture is passed via line 58 to separator 59. The liquid separated therein is passed via line 60, pump 61 to light ends withdrawal line 63. A part of the light ends fraction is passed via line 62 to column 55, as reflux. The vapor separated in separator 59 is passed via line 73 to refrigerated condenser 18.

A part of the reaction mixture is passed from reactor 10 via line 25, pump 27 line 26 to kettle 27. This kettle is provided with heating means (not shown) and agitating means such as a shaft 30 provided with propeller blades 31 and a motor 29. The mixture is heated in this kettle and vaporized ethyl chloride is passed via line 33 to condenser 35 and the resulting mixture is passed via line 35a to vessel separator 36. Any gas separated therein may be vented via line 36a. Alternatively, the gas (from 36a) may be returned to refrigerated condenser 18 (connection not shown). Liquid is passed from separator 36 via line 37, pump 38 and lines 39 and 22 to heavy ends column 40, for processing as already described.

If desired part of the vapors from kettle 28 may be passed via lines 33 and 34 to refrigerated condenser 18, wherein they are processed as already described. Additional aluminum chloride may be added as needed via line 13, hopper 14 and valve 15.

The spent catalyst is accumulated in kettle 28 until the kettle is substantially filled. Then the process is stopped, the kettle heated to remove vaporizable material which may be withdrawn (or processed in the system described) and then the kettle is drained, spent catalyst being removed via line 28a.

In this way, the reactor is substantially continuously purged of spent catalyst and heavy ends and the ethyl chloride which is removed with the purge is processed to remove at least a part of the heavy ends therein prior to recycling, whereby the reaction temperature is not unduly raised due to the presence of undesirable amounts of high-boilers in the reaction mixture.

Comparable results to the foregoing are achieved with various modifications thereof, including the following. The recovery of ethyl chloride may be carried out in any convenient manner although the system described above, removing the heavy ends first as bottoms and then removing the ethyl chloride in a separate column as a bottoms fraction is preferred since this enables one to produce a product of extremely low HCl content. The gaseous vapors separated in the knock-out vessels or separators may be processed in any convenient manner. However, the above described procedure of recycling the gaseous materials back to the reactor is preferred in order to obtain higher yield based on ethylene or HCl or both, as well as help control the reaction temperature in the reactor, as set forth more fully in a companion application filed herewith. The known reaction conditions catalyst concentration and reactant proportions are applicable in the present process.

The recycle may be within the range of 10 to 20% of the total fresh ethylene and fresh HCl in the feed.

Substantially all of the HCl and all of the ethylene is converted to the desired product ethyl chloride. The recycling of vapors together with some non-condensible gases improves stirring in the reactor by increasing gas throughput. This improves temperature control in the reactor operating at constant pressure. The higher gas circulation rate gives a lower reaction temperature. At the same time, the ratio of HCl to ethylene is accurately and readily controlled, without vent losses, since the latter are minimized by condensation and recycling.

The smooth and efficient operation of the process with high yield and adequate reaction temperature control achieved in accordance with the invention are indeed surprising especially when one considers the long time this problem has baffled those skilled in this art.

In view of the foregoing disclosures, variations and modifications thereof will be apparent to one skilled in the art, and it is intended to include within the invention all such variations and modifications except as do not come within the scope of the appended claims.

What is claimed is:

1. In a process for the preparation of ethyl chloride by the reaction of ethylene and hydrogen chloride in the presence of a liquid mixture of ethyl chloride and an aluminum chloride catalyst in a reaction zone; wherein the reaction temperature is controlled by the vaporization of ethyl chloride in said reaction zone; wherein said vapors are withdrawn from said reaction zone and passed to a separator, said vapors containing non-condensible gases, unreacted material, ethyl chloride, light ends and heavy ends; wherein non-condensible gases and the bulk of said unreacted materials are withdrawn as a vapor from said separator; wherein heavy ends, light ends and product ethyl chloride along with the residual unreacted materials are withdrawn from said separator as a liquid; and wherein said liquid is distilled in a first distillation column to separate heavy ends and a first distillate, and said first distillate passed to a second distillation column to separate light ends and product ethyl chloride; the improvement of recycling to said separator a portion of the first distillate and recycling to said reaction zone a portion of the vapors withdrawn from said separator.

2. The process of claim 1 wherein a portion of said light ends is recycled to said separator.

3. The process of claim 2 wherein the vapor recycled to said reactor contains from 10 to 200% of unreacted materials based on the fresh feed of ethylene and hydrogen chloride.

References Cited
UNITED STATES PATENTS

| | | | |
|---|---|---|---|
| 2,140,927 | 12/1938 | Pierce | 260—663 |
| 2,225,933 | 12/1940 | Slotterbeck | 260—663 |
| 2,353,563 | 7/1943 | Hemminger | 260—663 X |
| 2,434,093 | 1/1948 | Axe | 260—663 |
| 2,434,094 | 1/1948 | Axe | 260—663 |

LEON ZITVER, *Primary Examiner.*

ALPHONSO D. SULLIVAN, *Examiner.*

H. T. MARS, J. W. WILLIAMS, K. V. ROCKEY,
*Assistant Examiners.*